United States Patent [19]

Hulin et al.

[11] 4,442,575
[45] Apr. 17, 1984

[54] TOOL-SUPPORTING DEVICE FOR MACHINING A CYLINDRICAL ROD AND A MACHINING HEAD FITTED WITH SAID DEVICE

[75] Inventors: Jean-Pierre Hulin; Gilles DuBois; Marcel Paumier, all of Conflans Ste Honorine, France

[73] Assignee: Lignes Telegraphiques et Telephoniques, Conflans Ste Honorine, France

[21] Appl. No.: 316,943

[22] Filed: Oct. 30, 1981

[30] Foreign Application Priority Data

Dec. 31, 1980 [FR] France ............................. 80 27888

[51] Int. Cl.³ ..................... B23P 13/02; B23D 5/02
[52] U.S. Cl. ................................. 29/33.5; 409/259; 409/304
[58] Field of Search ............... 409/259, 260, 304, 305; 29/33 S, 33 F, 33 Q, 33.52, 56.5

[56] References Cited

U.S. PATENT DOCUMENTS 2,323,700 7/1943 Bailey ................................ 409/305
3,149,535 9/1964 Vaughn ............................. 409/304

FOREIGN PATENT DOCUMENTS 2507951 10/1975 Fed. Rep. of Germany ...... 409/259
1476393 2/1967 France ................................ 29/33 S
2413962 3/1979 France ............................... 409/259
52-53593 4/1977 Japan ................................. 409/259

Primary Examiner—William R. Briggs

[57] ABSTRACT

The device for supporting a cutting-tool is intended to be placed in a head for machining grooves in a cylindrical rod and mainly comprises a frusto-conical support member having an axial bore through which the cylindrical rod to be machined is capable of passing. The support member is placed within a frusto-conical recess of the machining head and provided with a cutting-tool recess having an opening which defines the profile of the cylindrical rod. The cutting-tool is clamped within its recess by means of a ring which is screwed into the support member and has a control front face for receiving the rod to be machined.

9 Claims, 2 Drawing Figures

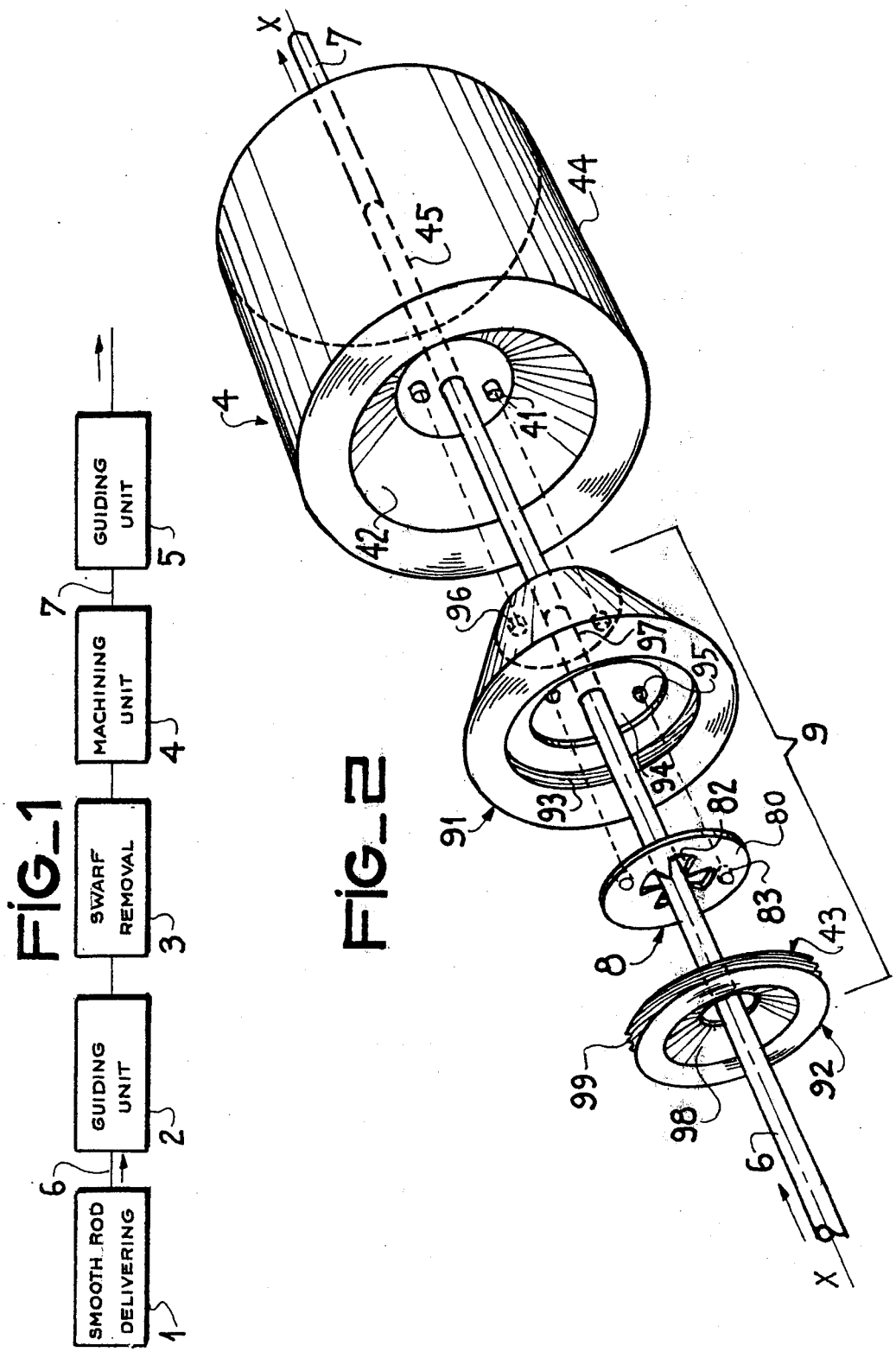

TOOL-SUPPORTING DEVICE FOR MACHINING A CYLINDRICAL ROD AND A MACHINING HEAD FITTED WITH SAID DEVICE

This invention relates to the field of continuous machining of grooves in a cylindrical rod, the grooves being usually longitudinal. The invention is more particularly directed to a device for supporting the machining tool.

The general term "rod" as used hereafter is understood to refer to a cylindrical element of substantial length, of any type which may or may not have a composite structure and in which the dimensions, constituent material or materials of said element are not relevant to the invention.

There are some applications in which machining of grooves in a cylindrical rod must be performed with a high degree of accuracy. This is the case in particular when the cylindrical rod is intended to constitute a support for optical fibers which are then placed in the grooves. In practice, a supporting rod of this type is usually of composite structure and of substantial length while having a small diameter (of the millimeter or centimeter order) and the possibility of machining a maximum number of grooves of very small size in the rod is economically attractive. Moreover, in the case of an application to optical fibers, these fibers are known to be highly vulnerable to micro-stresses which usually result in attenuation of the signal. In consequence, the dimensions of the grooves must be highly uniform. Finally, in all applications, it is a desirable objective to operate at the maximum production rate.

A known method for continuous machining of grooves in a thin cylindrical rod of composite structure has already been disclosed in French patent Application No. 2,413,962 and in its Addition No. 2,428,513. Said rod is composed of a rigid core surrounded by a smooth plastic sheath; the grooves are parallel to the axis of the rod or disposed in a helix having a simple or alternate twist and having as a rule a fairly long pitch compared with the rod diameter. As specified in the cited patent applications, machining of the grooves is performed by means of a machining head between two rod-guiding movements. The machining head has a portion for heating the rod and carries a cutting-tool placed directly within a recess formed in the head, the rod being passed through the center of the tool and of the head. In the case of helical grooves, the machining head is driven in a relative movement of rotation with respect to the rod. This form of construction has the advantage of being simple but suffers from different drawbacks including relatively inaccurate positioning of the tool. A further drawback lies in the fact that the tool is heated to a temperature which is not necessarily very uniform.

It is an object of the present invention to provide an improvement in a machining head of this type with a view to achieving enhanced accuracy of machining. This is realized by interposing a tool-holder device between said machining head and the cutting-tool. Said tool-holder makes it possible in particular to position the tool with a higher degree of accuracy as well as to ensure greater uniformity of temperature of said tool and easier maintenance than was hitherto the case in known devices.

According to the invention, there is provided in a machining head for machining a cylindrical rod, a tool supporting device which serves to support a tool for machining a cylindrical rod, said head being provided with a recess of a generally conical shape and a bore which extends right through said head and through which the rod is capable of passing, said device comprising a support member of generally conical shape having substantially the same slope as said recess in the head, and being positioned in said recess, said support member being provided with a further bore extending right through said member and a further recess for receiving said tool, so that the bore of said machining head and the bore of said support member are in aligned relation.

These and other features of the invention will be more apparent upon consideration of the following description and accompanying drawings, wherein:

FIG. 1 is a block diagram showing a system for machining a cylindrical rod;

FIG. 2 is an exploded view in perspective showing one embodiment of the device in accordance with the invention for supporting a machining tool.

There are therefore shown diagrammatically in FIG. 1 the different units required for machining a cylindrical rod as described, for example, in the French patent Application and Addition cited earlier.

First of all, this system comprises a unit 1 for delivering a smooth rod 6 consisting, for example, of a rigid core covered by extrusion with a smooth sheath of insulating material. By way of example, said unit can be constituted by a payoff reel which rotates about an axis at right angles to the axis of displacement of the rod.

The rod 6 thus delivered then passes into a guiding unit 2. The design function of said unit is to guide the cylindrical rod along a predetermined axis while limiting its movements in the other two dimensions and, if so required, to cause displacement of the rod at a speed which is also predetermined. In an alternative embodiment, this rod-displacement function can be performed by a separate unit (not shown in the drawings). Furthermore, it is preferable to ensure that the rate of displacement is controlled in any known manner in order to obtain a higher degree of machining accuracy, especially when the grooves to be machined are helical.

The system further comprises a machining unit 4 which is illustrated in greater detail in FIG. 2. Said unit mainly consists of a heated machining head which may be associated if necessary with a temperature control device (not illustrated in the accompanying drawings). In the case of helical grooves, said machining head is subjected by any suitable means not shown in the drawings to a movement of rotation with respect to the rod 6, said movement of rotation being preferably controlled in dependence on the rate of travel of the rod.

At the exit of the machining unit 4, the grooved rod designated by the reference 7 is again maintained by a guiding unit 5 which is advantageously similar to the unit 2.

The rod may subsequently be stored on a takeup reel or employed directly. By way of example, in the case of optical-fiber supports, the system for laying fibers in the grooves can be placed immediately after the guiding unit 5.

In a preferred embodiment, the system further comprises a device 3 for removal of swarf, said device being located upstream of the unit 4 and designed, for example, in the manner described in the patent applications cited in the foregoing.

FIG. 2 illustrates one embodiment of the device according to the invention.

The machining head designated by the general reference numeral 4 comprises a metallic heating body 44 having a generally cylindrical shape, for example, and having an axis X—X. A bore 45 extends right through the body, for example along the axis X—X, and provides a passageway for the displacement of the cylindrical rod. On the face located upstream in the direction of travel of the rod 6, the cylinder 44 is provided with a recess 42 of generally frusto-conical shape which has the same axis X—X and is intended to receive a tool-holder 9.

The tool-holder 9 is composed of a support member 91 in which a cutting-tool 8 can be fitted, and of a clamping ring 92 which is intended to hold the tool 8 in position.

The support member 91 is given a frusto-conical external shape having the same angle of slope as the recess 42 and is provided internally with a first annular shoulder 93 for receiving the ring 92, then with a second annular shoulder forming a recess 94 at the bottom of the support member for receiving the cutting-tool 8. Similarly, said support member 91 is pierced by a bore 97 having substantially an axis X—X through which the rod 6 is permitted to pass. Provision is also made for at least one and preferably four positioning studs 41 which project within the recess 42 and cooperate with blind-end holes 96 formed in the support member 91. Only two studs 41 and two holes 96 are illustrated in the figure for the sake of enhanced clarity.

By way of example, the cutting-tool 8 is constituted by a thin disk 80 provided in its central zone with an opening 82, the axis of symmetry of which coincides with the axis X—X of displacement of the rod. The shape of said opening 82 defines the profile of the rod 7 after machining. The cutting-tool 8 further comprises at least one and preferably two holes 83 which are adapted to cooperate for positioning with studs 95 in the support member 91.

The tool 8 is maintained within the recess 94 by means of the ring 92, which is fixed in the recess 94 by any known means. For example, as shown, the periphery 99 of the ring 92 is threaded in a manner which corresponds to the internal screw-thread 93. One face 43 of said ring 92 which holds the tool 8 in position is flat whereas the other face 98 is at least partly frusto-conical in order to facilitate the guiding of the rod 6 within the opening 82 of the tool 8, as well as the removal of swarf, since the removal is easier the swarf is not too heated and broken.

The different components 91 and 92 of the tool-holder 9 and the tool 8 itself must be precision pieces, and are advantageously of metal and formed by a precision cutting method like electrical discharge machining (EDM), also known as the spark-erosion process.

At the time of initial positioning, the tool is placed within the recess 94 by means of the positioning studs 95 and corresponding holes 83. Preferably, the tool is forcibly engaged within said recess, then fixed in position by means of the clamping ring 92 which is screwed into the support member 91. The assembly consisting of tool-holder 9 and tool 8 is then placed within the recess 42 of the machining head 4, positioning being carried out by causing the studs 41 to cooperate with the blind-end holes 96. While machining is in progress, the tool-holder and its tool are maintained in position by the movement of displacement of the rod without any other fastening means. When the machining operation is interrupted, a yoke (not described) is used for maintaining the assembly.

During operation, the cylindrical rod 6 is displaced in translational motion along the axis X—X. When the grooves to be machined are of the helical type, the machining head 4 is subjected to a movement of rotation with respect to its axis X—X, said movement being either alternating or continuous according as the helix does or does not have an alternate twist, and the tool 8 cuts the rod 6 in accordance with the profile determined by the opening 82. Thus in the example shown, said tool cuts four grooves in the rod.

A tool-holder of this type therefore facilitates positioning and removal of the tool 8 for such purposes as cleaning or replacement. Furthermore, the tool-holder makes it possible to improve the thermal contact between the cutting-tool 8 and the heating body 44, which is conducive to a more uniform temperature of the tool. Furthermore, it facilitates the swarf removal. Finally, the tool-holder permits enhanced accuracy of tool-positioning, especially by virtue of the conical-surface method which is more precise than simple placing of a tool within a recess of the same type as the recess 94 but formed directly in the machining head 4.

By way of example, accuracy of centering of the order of one hundredth of a millimeter has been obtained in the machining of ten grooves or more in a rod approximately 4 millimeters in diameter.

What is claimed is:

1. In combination: a machining head provided with a recess of a generally conical shape and a bore extending therethrough and through which a cylindrical rod to be machined is capable of passing, a tool supporting device for supporting a tool for machining a cylindrical rod, said tool supporting device comprising a support member of generally conical shape having substantially the same slope as said recess in said machining head, and being positioned in said recess, said support member also being provided with a bore extending through said member and with a further recess for receiving a tool, the bore of said machining head and the bore of said support member being in aligned relation with each other.

2. The combination according to claim 1, wherein said tool supporting device further comprises a clamping ring fixed on said support member, for clamping a tool within said recess in the support member.

3. The combination according to claim 2, wherein said clamping ring has a bore in aligned relation with the bores of said head and said support member, and wherein said clamping-ring has an at least partly conical surface to be located opposite to a tool.

4. The combination according to claim 2, wherein said support member is provided with an internally-threaded annular shoulder forming a third recess for said clamping ring, the periphery of said clamping ring being threaded in a corresponding manner.

5. The combination according to claim 1, wherein said bore of the support member extends right through said recess in the support member.

6. The combination according to claim 1, wherein said recess in said support member comprises positioning means for a tool.

7. The combination according to claim 1, wherein said support member comprises first positioning means and said recess in the head comprises second positioning means cooperating with said first positioning means.

8. The combination according to claim 7, wherein said support member is frusto-conical and wherein said first positioning means comprise blind-end holes carried by the small end face of the frusto-conical member, said recess in the head being also of frusto-conical shape, the small end face of said last recess carrying positioning studs in cooperating relation with said blind-end holes.

9. In combination: a machining head provided with a recess of a generally conical shape and a bore extending therethrough and through which a cylindrical rod to be machined is capable of passing; a tool supporting device comprising a support member of generally conical shape having substantially the same slope as said recess in said machining head, and being positioned in said recess, said support member also being provided with a bore extending through said member and with a further recess, the bore of said machining head and the bore of said support member being in aligned relation with each other; and a tool for machining said rod, said tool being positioned in said further recess of said support member.

* * * * *